United States Patent
Hrusch et al.

(10) Patent No.: US 11,149,631 B2
(45) Date of Patent: Oct. 19, 2021

(54) HYDRAULICALLY OPERATED TWO SPEED FRONT END ACCESSORY DRIVE

(71) Applicant: Schaeffler Technologies AG & Co. KG, Herzogenaurach (DE)

(72) Inventors: Nicholas Hrusch, Wooster, OH (US); Joshua Hixenbaugh, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 117 days.

(21) Appl. No.: 16/683,973

(22) Filed: Nov. 14, 2019

(65) Prior Publication Data
US 2021/0048091 A1    Feb. 18, 2021

Related U.S. Application Data

(60) Provisional application No. 62/887,955, filed on Aug. 16, 2019.

(51) Int. Cl.
*F02B 67/06*    (2006.01)
*F16H 3/54*    (2006.01)
(Continued)

(52) U.S. Cl.
CPC .............. *F02B 67/06* (2013.01); *F16H 3/54* (2013.01); *F16H 57/0439* (2013.01);
(Continued)

(58) Field of Classification Search
CPC ........ F16H 3/54; F16H 55/36; F16H 57/0439; F16H 57/0441; F16H 2200/0034;
(Continued)

(56) References Cited

U.S. PATENT DOCUMENTS

| 4,800,782 A | * | 1/1989 | Sivalingam | ............. F02B 67/00 475/318 |
| 2008/0179119 A1 | * | 7/2008 | Grenn | ................... B60W 20/10 477/5 |

(Continued)

FOREIGN PATENT DOCUMENTS

WO    WO-2012045296 A1  *  4/2012  ............. B60K 25/02

OTHER PUBLICATIONS

U.S. Appl. No. 16/456,137, filed Jun. 28, 2019 (priority date of Jun. 28, 2018) (unpublished).

*Primary Examiner* — Charles A Fox
*Assistant Examiner* — Lori Wu
(74) *Attorney, Agent, or Firm* — Volpe Koenig

(57) ABSTRACT

A front end accessory drive system is disclosed. The system includes a hub configured to drivingly engage with a crankshaft and a gear transmission system. A one-way clutch includes a first bearing ring connected to an end of a plurality of planet pins of the gear transmission system, and a second bearing ring connected to a sun gear of the gear transmission system. A pump configured to direct hydraulic fluid through a hydraulic fluid circuit. A clutch pack is in fluid connection with the hydraulic fluid circuit. The clutch pack includes at least one clutch plate supported by the gear transmission system, such that a portion of the gear transmission system is grounded via frictional engagement of the at least one clutch plate in an actuated state of the clutch pack.

10 Claims, 9 Drawing Sheets

(51) Int. Cl.
*F16H 57/04* (2010.01)
*F16H 55/36* (2006.01)

(52) U.S. Cl.
CPC ......... *F16H 57/0441* (2013.01); *F16H 55/36* (2013.01); *F16H 2200/0034* (2013.01)

(58) Field of Classification Search
CPC ..... F16H 2200/2005; F16H 2200/2035; F16H 2200/2066; F16H 2200/2082; B60K 2025/005; B60K 2025/022; B60K 25/00; F02B 67/06; F02B 67/04; F02N 11/04
See application file for complete search history.

(56) References Cited

U.S. PATENT DOCUMENTS

| | | | |
|---|---|---|---|
| 2009/0101465 A1* | 4/2009 | Hart | B60W 20/00 192/41 R |
| 2011/0319214 A1* | 12/2011 | Showalter | F02N 15/00 475/149 |
| 2013/0035193 A1 | 2/2013 | Janson et al. | |
| 2017/0232949 A1* | 8/2017 | Tao | B60W 10/06 701/60 |
| 2019/0203637 A1* | 7/2019 | Lee | F02B 67/06 |
| 2019/0301573 A1 | 10/2019 | Hrusch et al. | |
| 2020/0003113 A1* | 1/2020 | Hrusch | F02B 67/06 |

\* cited by examiner

HYDRAULICALLY OPERATED TWO SPEED FRONT END ACCESSORY DRIVE

INCORPORATION BY REFERENCE

This application claims priority to U.S. Provisional Application No. 62/887,955, which was filed Aug. 16, 2019, and is incorporated herein by reference in its entirety.

FIELD OF INVENTION

The present disclosure relates to front-end accessory drive (FEAD) systems.

BACKGROUND

Accessory drive systems are well known. For example, US Pub. 2013/0035193 discloses a vehicle accessory drive system. Known vehicle accessory drive systems suffer from some performance issues regarding restart functionality. There is a general desire to provide restart functionality due to high torque during certain start conditions. There is also consumer demand to increase the level of torque control in accessory drive systems. In some hybrid electric vehicles, redundant starting systems are required to facilitate starting of the engine under all operating conditions.

In order to provide improved fuel economy, a two speed FEAD has been considered. There is a general need to further electrify certain engine systems with the addition of a 48V system and P0 BiSG (i.e. belt-drive integrated starter generator). It would be desirable to enable "hot-start" engine cranking events for stop-start, as well as enabling engine-off accessory running without the need to power or electrify the accessory elements individually.

There is a need for engine systems including redundant starting systems to be able to provide all the required restart functionality. Some known engine systems include a modular hybrid transmission, a traditional 12V starter, and a belt starter. For other engine systems, a 48V BiSG on a second sheave on a crankshaft pulley can be used to allow more complex mild-hybrid function, but it cannot by itself completely eliminate the traditional 12V starter because of the high torque demand during "hot start" conditions. In addition, adding a P0 unit by itself does not allow engine-off accessory driving because the crankshaft pulley cannot be disconnected from the BiSG.

Accordingly, there is generally a need for an improved two speed FEAD that addresses all of these concerns and performance requirements.

SUMMARY

Adding a hydraulically actuated two speed FEAD to an engine system addresses these concerns and provides the missing functionality. The gear ratio in these systems can be chosen to provide torque amplification between the BiSG and the crankshaft, which allows the BiSG to have enough torque to start the engine under any circumstance. This eliminates the need for an additional starter motor.

An additional benefit of this arrangement allows for increased boosts of torque from the BiSG for hard acceleration events, or for other torque-fill modes. In addition, the two speed FEAD is naturally overrunning when the engine is turned off due to the one way clutch within it. This automatically enables engine off accessory running, to increase cabin comfort for passengers during stop-start events. This also eliminates the need for electrified water pump and electrified A/C, both of which are substantially more expensive than traditional ones.

The hydraulic actuation adds a final benefit to the restart strategy. The hydraulic actuation provides increased or fine torque control from the solenoid valve and removes the need to reduce the BiSG to zero speed before attempting to change states of the two speed FEAD, which substantially reduces the restart time required. It is well known that restart time is a critical parameter for the acceptability of a stop-start event.

In the embodiments disclosed herein, a gear ratio can be chosen to provide torque amplification between the BiSG and the crankshaft, which allows the BiSG to have enough torque to start the engine under any circumstance.

This device could also be used to provide additional charge margin and fuel economy as in a diesel application. The same kinematic layout disclosed herein can be used as a speed boost to the FEAD.

In one embodiment, a drive system is disclosed. The system includes: a hub configured to drivingly engage with a crankshaft; a gear transmission system including: a planet carrier connected to the hub; a ring gear supporting at least one clutch plate; a plurality of planet gears each drivingly engaged with the ring gear; and a sun gear drivingly engaged with the plurality of planet gears. A plurality of planet pins each include a first end supported in the planet carrier, and each planet gear of the plurality of planet gears is supported on a respective planet pin of the plurality of planet pins. A one-way clutch includes a first bearing ring connected to a second end of the plurality of planet pins, and a second bearing ring connected to the sun gear. A pump is configured to direct hydraulic fluid through a hydraulic fluid circuit. A clutch pack is in fluid connection with the hydraulic fluid circuit. The clutch pack includes at least one clutch plate supported by the ring gear, such that the ring gear is grounded via frictional engagement of the at least one clutch plate in an actuated state of the clutch pack.

A two speed FEAD system is disclosed. The system includes a hub configured to drivingly engage with a crankshaft and a gear transmission system. A one-way clutch includes a first bearing ring connected to an end of a plurality of planet pins of the gear transmission system, and a second bearing ring connected to a sun gear of the gear transmission system. A pump is configured to direct hydraulic fluid through a hydraulic fluid circuit. A clutch pack is in fluid connection with the hydraulic fluid circuit. The clutch pack includes at least one clutch plate supported by the gear transmission system, such that a portion of the gear transmission system is grounded via frictional engagement of the at least one clutch plate in an actuated state of the clutch pack.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
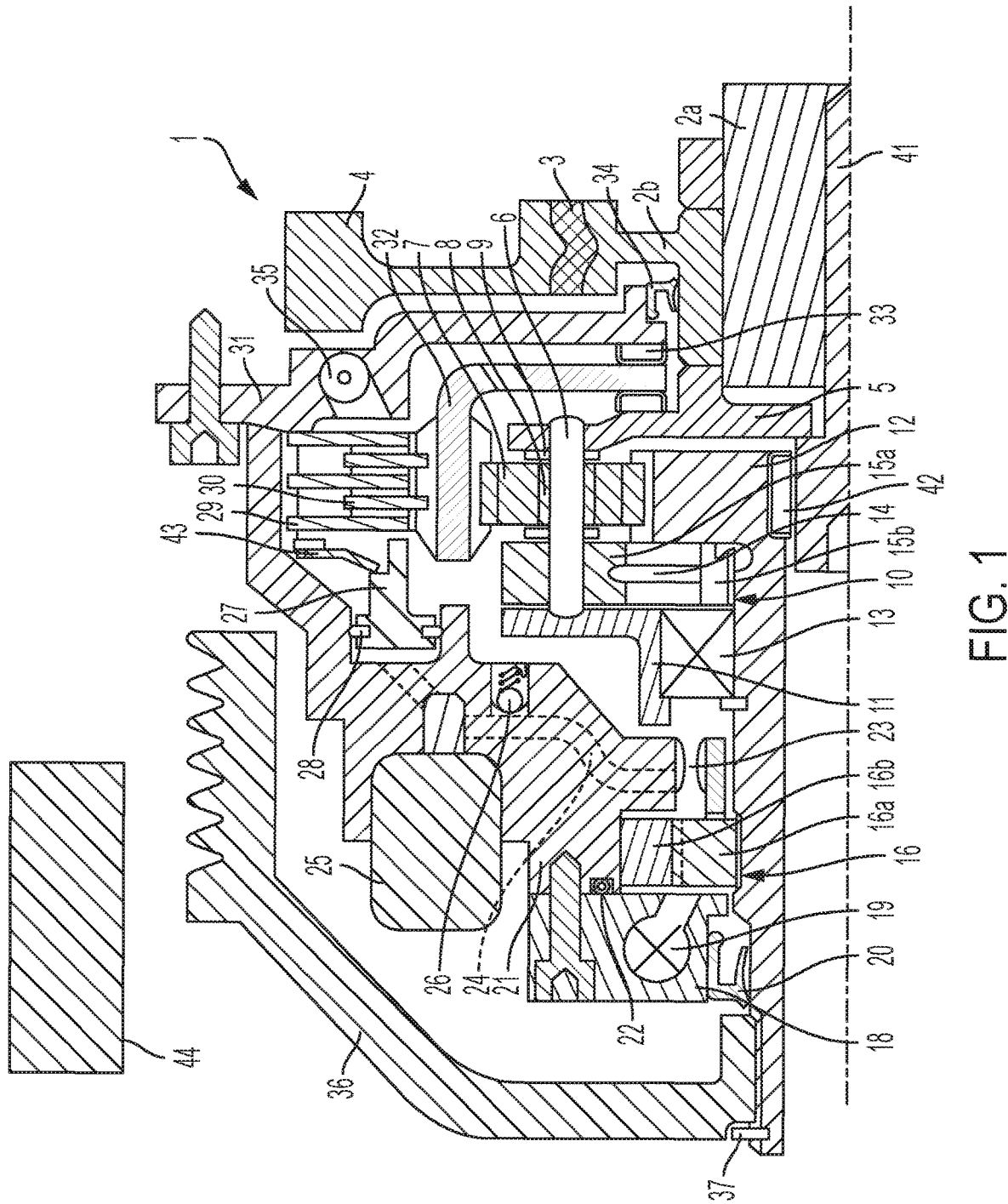
FIG. 1 is a cross-sectional view of a first embodiment of a drive system.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Various embodiments are disclosed herein with varying arrangements but essentially having similar kinematic and hydraulic fluid schematics unless specifically identified herein. In one embodiment, a sun gear output is connected to a pulley which drives a traditional belt drive and off-axis P0 e-machine. The term e-machine is used generally herein to refer to an electric motor, such as a motor including a rotor, stator, windings, resolver, etc.

In another embodiment, a concentrically e-machine is directly integrated to the housing of the two-speed FEAD. This offers substantial weight and cost savings, as it saves an entire belt and pulley system, two tensioners (the off-axis BiSG requires one for drive and coast separately), and provides a shield or shroud to protect the extra belt. This arrangement also makes use of the existing static elements in the rest of the assembly for mounting, saving additional space, cost, and weight.

The basic principle of operation is similar among all of the embodiments disclosed herein. Each embodiment includes a hydraulically operated two-speed FEAD. The embodiments vary in terms of whether a pump is integrated with the FEAD or not integrated with the FEAD, i.e. an auxiliary pump provided external from the FEAD, and whether this is a concentric e-machine or an off-axis e-machine, or no e-machine at all.

All of the embodiments disclosed herein provide significant additional benefits because the embodiments provide cooling flow to the gearbox and much greater clutch controllability. The term gearbox is used generally herein to refer to any one or more components of a planet carrier 5, planet pins 6, planet gears 7, and sun gear 12. The kinematics are superior in terms of splash lubrication, as all non-rotating parts are on the exterior.

The embodiments disclosed herein connect the crankshaft to a planetary gearset, which has a one way clutch connecting the carrier to the sun gear. This configuration provides an output to the FEAD at a 1:1 ratio with crankshaft speed by default. A hydraulic pump is connected to the sun gear (which is always rotating, either from the engine or e-machine, and thus can always provide pressure and flow) and pulls lubrication from a source (e.g. engine oil from the engine oil pan or sump).

This pump provides a lubrication path through the bearings, one way clutch (OWC), gearset, and clutch pack inside the assembly. The pump also provides a regulated pressure line that is controlled with a solenoid valve. This valve controls whether or not pressure is applied to a clutch pack that connects the ring gear to ground. When the ring is grounded, a ratio is created through the assembly, which enables enhanced boost from the e-machine, or extra cranking torque.

As shown in FIGS. 1, 3, 4, 5A, 5B, a drive system 1 is disclosed. In FIG. 1, a crankshaft 2a and a harmonic balancer are provided. The harmonic balancer includes a hub 2b, elastomer or spring element 3, and inertia ring 4 connected to a planet carrier 5. The planet carrier 5 transmits engine torque into planet pins 6 which drive a transmission planet gear arrangement consisting of the planet gears 7, a radial bearing 8, and thrust washers 9.

The second half of the planet carrier is also the OWC outer race or ring 15a and a bearing support plate 11, which centers the planet carrier 5 to the sun gear 12 through a bearing 13. This bearing also internally reacts to a thrust load when helical gears are used. The OWC 10 is illustrated here as a wedge type one way clutch, including wedge plates 14 and an inner race or ring 15b that connects the wedge plates 14 to the sun gear 12. One of ordinary skill in the art would understand that alternative forms of clutches can be used.

The sun gear 12 directly drives the hydraulic pump 16, shown here as an inner gerotor 16a and a co-rotating outer gerotor 16b. One of ordinary skill in the art would understand that the pump 16 can be provided in any form. The hydraulic pump 16 is retained by an outer housing 18 that has a connection point for the fluid inlet 19 and a dynamic seal 20 to retain fluid within the assembly. Other retention arrangements can be used for retaining the hydraulic pump 16. Additionally, other embodiments disclosed herein illustrate the hydraulic pump as being external from the system.

On the other side of the pump 16 is a central housing 21, and the two housing halves are sealed with an o-ring 22. The central housing 21 has two primary fluid paths. The first path is an orifice 23 that allows flow from the pump 16 to pass into the gearbox. The location of the orifice 23 is chosen to encourage forced flow through the bearing 13, OWC 10, and gearset. The dimensions of the orifice 23 can be provided to alter the pressure of fluid flowing from the pump 16 and through the orifice 23.

The high pressure fluid path 24 through the central housing 21 builds pressure because of the flow restriction caused by the orifice 23. A solenoid valve 25 controls the flow through this high pressure line 24, and a blow-off valve 26 vents excess pressure from this line into the gearbox, to limit the amount of drag in the pump 16. When the solenoid valve 25 allows flow through, it starts to pressurize the fluid chamber behind the piston 27, which is sealed with sliding seals 28 (shown as D-rings). This piston 27 first acts on a first plurality of separator plates 29, and clamps a number of clutch plates 30 as the pressure builds, before eventually bottoming out on an end stop of the inner housing 31.

The clutch plates 30 are connected to the ring gear 32, which is axially retained by thrust bearings 33 against the planet carrier 5 and the inner housing 31. The inner housing 31 also retains another dynamic seal 34, and contains the connection point for the fluid outlet 35.

The output of the system in FIG. 1 is shown as a pulley 36, splined to the sun gear 12 and retained with a retaining ring 37. One of ordinary skill in the art would understand that the pulley 36 can be mounted to the system in a variety of ways. In one embodiment, the pulley 36 connects to an off axis e-machine 44 through a belt system, as well as the rest of the traditional FEAD elements (i.e. water pump, A/C etc.). The off axis e-machine 44 is illustrated schematically in FIG. 1. The term "output" is understood by one of ordinary skill in the art to mean any component, configuration, or arrangement of transmitting torque and rotation to a remainder of the front end accessories, such as the belt, chain, shaft, etc.

In one embodiment, the entire gearbox and OWC assembly is clamped to the crankshaft 2a through a central bolt 41, which also centers the sun gear 12 to the crankshaft 2a through a radial bearing 42. This provides an improved way for mounting these components with each other and makes assembly easier than known systems.

Figure 2:
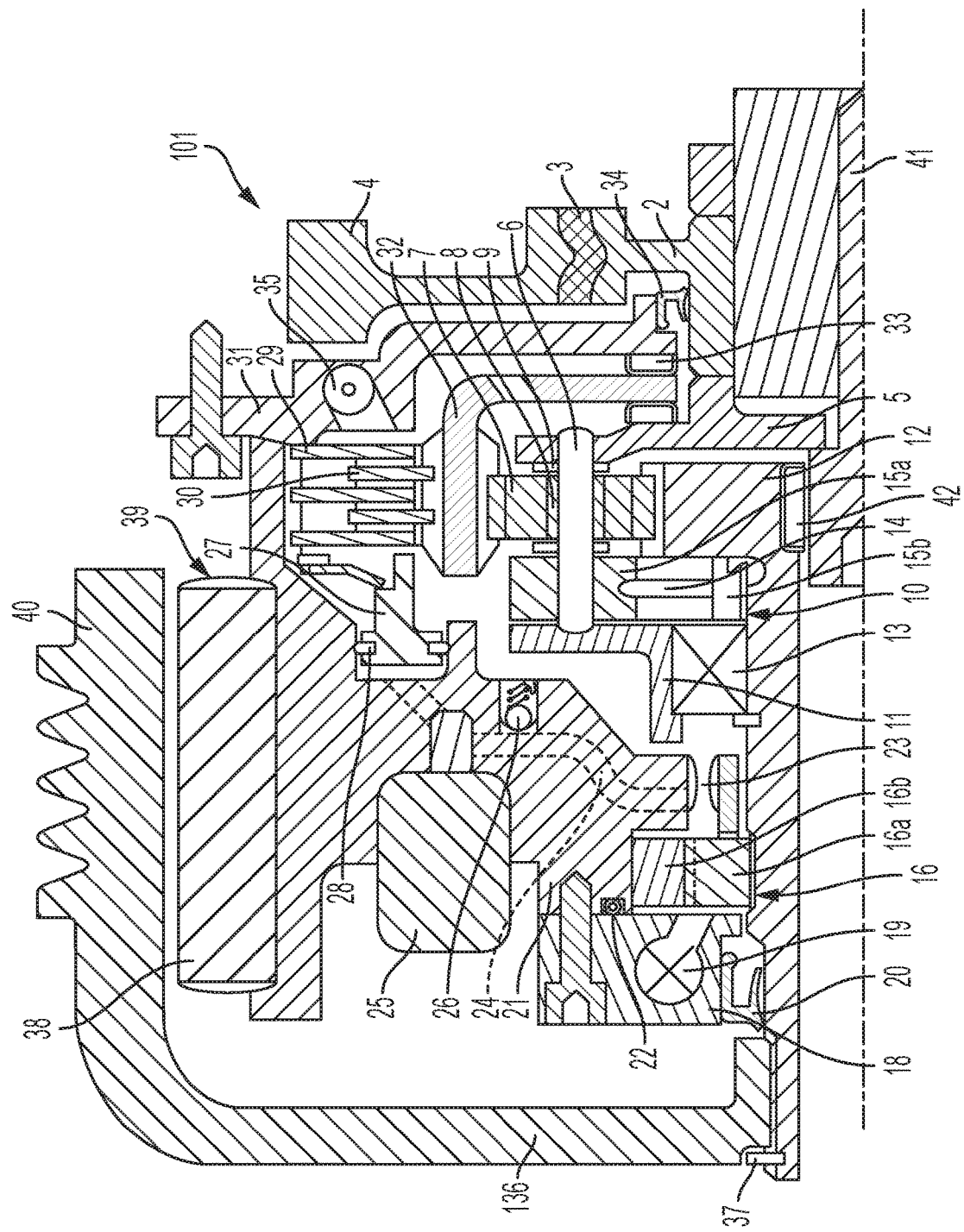
FIG. 2 is a cross-sectional view of a second embodiment of a drive system.

FIG. 2 is similar to FIG. 1, but illustrates a drive system 101 including an e-machine that is concentrically integrated into the system, instead of an off axis e-machine. Any components not specifically identified with respect to FIG. 2 but having the same reference numerals as FIG. 1 are otherwise functionally identical or similar. As shown in FIG. 2, the motor's stator 38 can be integrated with the central housing 21, and wires 39 can be routed out of the assembly. As shown in FIG. 2, the motor's rotor 40 is integrated into the pulley 136, and drives the traditional accessory elements. Similar to the embodiment of FIG. 1, the pulley 136 also is connected to the sun gear 12.

Figure 3:
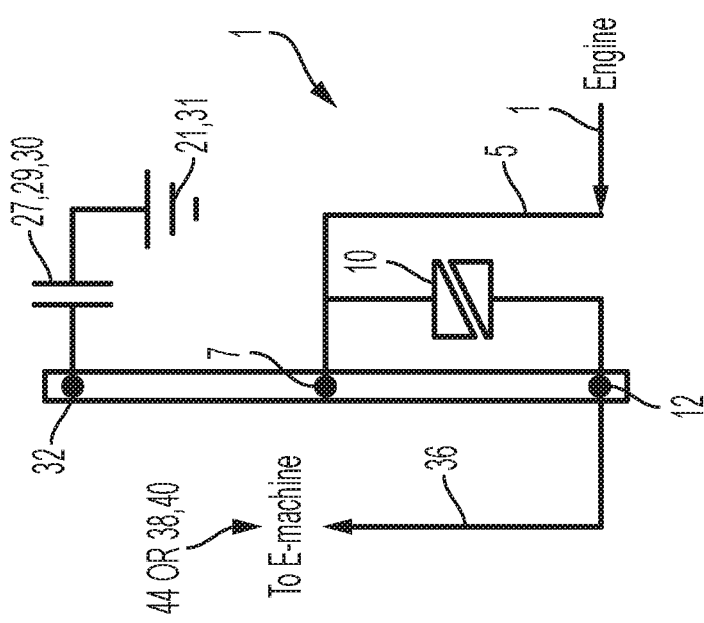
FIG. 3 is a kinematic diagram for the drive system.

FIG. 3 shows a kinematic schematic diagram of the system 1, 101. As shown in FIG. 3, the engine input (i.e. crankshaft 2a) is connected to the planet carrier 5, which is connected to the planet gears 7 and the OWC 10. The torque path through the OWC 10 leads to the sun gear 12. As shown in FIG. 3, the pulley 36 is kinematically connected to the sun gear 12. The pulley 36 is connected to components of the e-machine, i.e. such as a stator 38 or a rotor 40. From the ring gear 32, the kinematic diagram shows the connection to the piston 27, and plates 29, 30, as well as to the central housing 21 and the inner housing 31.

During normal operation, the engine transmits torque into the gearbox through the crankshaft 2a and the planet carrier 5. The OWC 10 is oriented so that when the engine is driving the FEAD, it locks the planet carrier 5 to the sun gear 12, and the whole planetary gearset co-rotates at 1:1 speed with the crankshaft 2a. Torque is split through the gears and the OWC 10, which ensures that the gear meshes are always loaded, and additionally the OWC 10 isolates any negative torque from the engine from passing to the gears. As a result, gear rattle is prevented, and overall noise, vibration, and harshness (NVH) to the FEAD is improved from a stock system.

Figure 4:
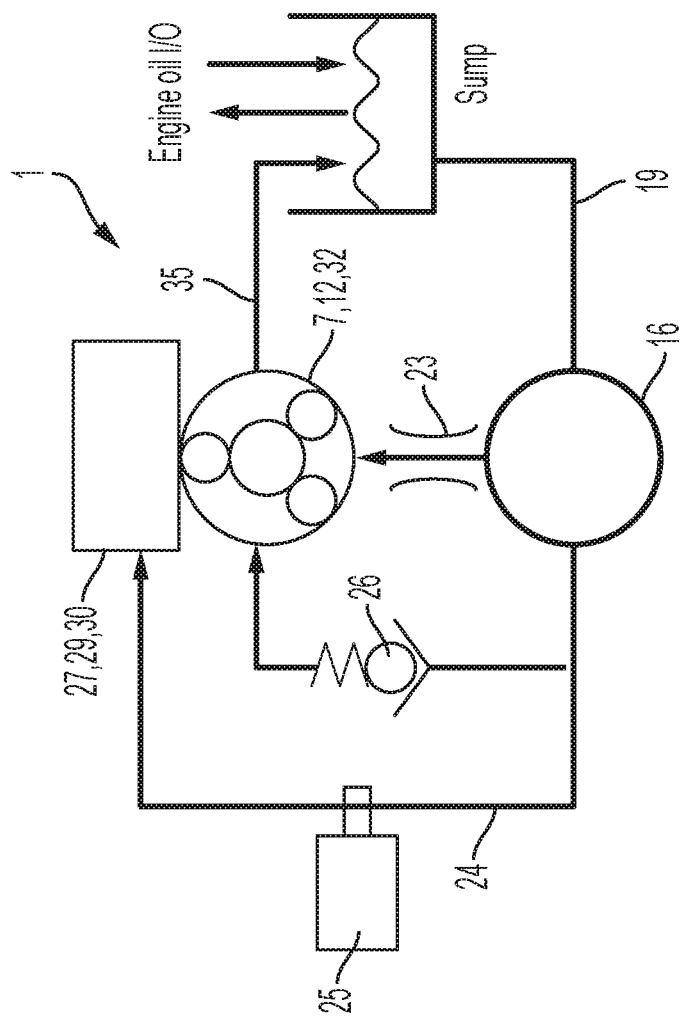
FIG. 4 is a hydraulic diagram for the drive system.

FIG. 4 shows a hydraulic circuit schematic diagram for the system 1, 101. As shown in FIG. 4, a sump is provided with a reservoir of hydraulic fluid or oil. The sump is connected to the fluid inlet 19 and the fluid outlet 35. The fluid inlet 19 connects the sump to the pump 16, which can either be integral to the system or an auxiliary pump. From the pump 16, hydraulic fluid is forced through the orifice 23 to the gear set (i.e. gears 7, sun gear 12, ring gear 32). The high pressure fluid path 24 is defined between the pump 16 and the valve 25. The blow-off valve 26 is also illustrated in the hydraulic circuit schematic diagram. Pressurized fluid is provided through the high pressure fluid path 24 to the friction clutch pack (i.e. piston 27, and plates 29, 30).

In default operation, the sun gear 12 drives the pump 16 and provides flow though the mechanical parts in the gearbox, but the high pressure line 24 remains closed by the valve 25. Any excess pressure produced in the pump 16 is vented by the blow-off valve 26 so that drag is kept to a minimum. If a boost event is requested and extra torque is needed, the e-machine can be commanded to overcome the engine torque and provide power to the wheels. At the same time, the valve 25 can pressurize the clutch pack, which grounds the ring gear 32 to the central and inner housings 21, 31. This provides a speed reduction from e-machine to crankshaft 2a, allowing higher torque levels during boosts. When regular operation is again desired, pressure is released from the clutch pack which is returned via return spring 43.

Figure 5A:
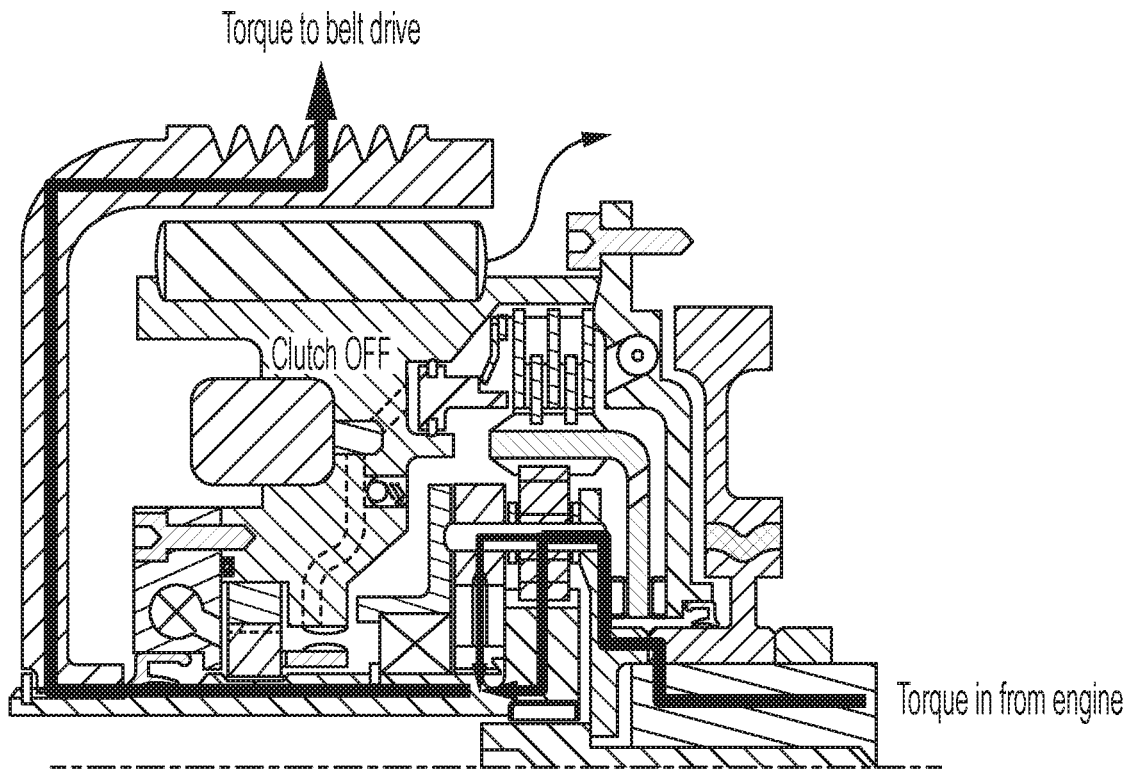
FIG. 5A is a schematic diagram illustrating a torque flow path through the drive system in a first state.

FIG. 5A is a schematic diagram illustrating a torque flow path through the drive system 101 in a first state. As illustrated in this Figure, torque is supplied from the engine, i.e. via the crankshaft 2a, through the gearset assembly and the OWC 10, and ultimately to the pulley 36. This mode corresponds to a mode in which the clutch is de-activated or off.

Figure 5B:
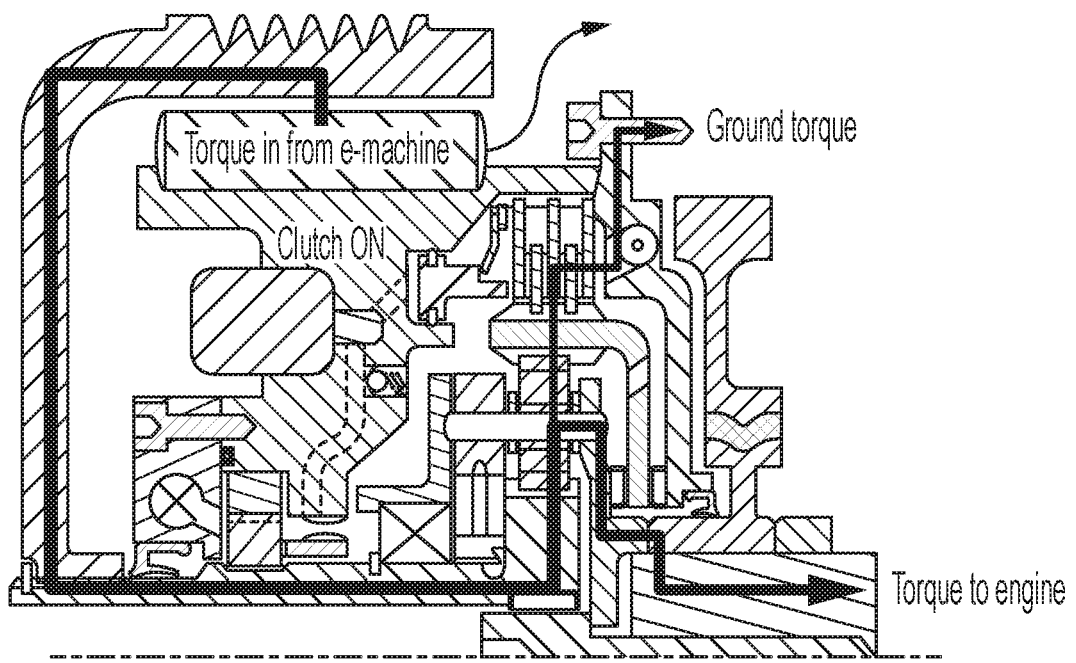
FIG. 5B is a schematic diagram illustrating a torque flow path through the drive system in a second state.

FIG. 5B is a schematic diagram illustrating a torque flow path through the drive system 101 in a second state. In the second state, the clutch is on or activated, and torque from the e-machine is grounded (via the friction clutch pack), and torque is supplied to the engine.

During a start-stop event, the engine can be turned off any time without losing accessory power, because the e-machine can continue spinning, and the OWC 10 passively overruns in this case. To restart, the clutch is applied while commanding cranking torque on the e-machine, and the control offered by the valve 25 allows this to happen quickly and without belt NVH problems.

Figure 6:
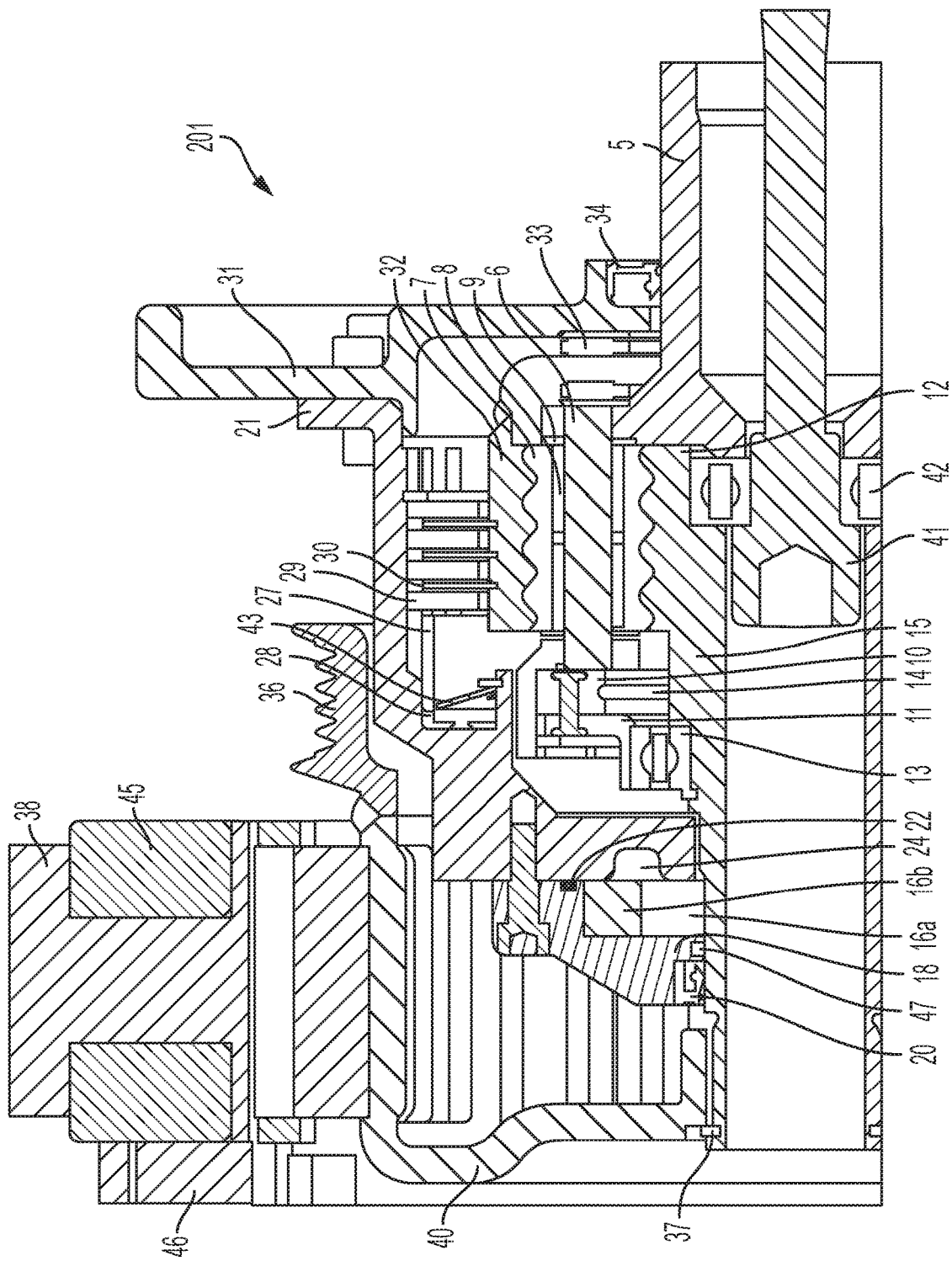
FIG. 6 is an additional cross-sectional view of the drive system.

FIG. 6 illustrates another embodiment of a drive system 201, which is functionally identical to the drive systems 1, 101 except for the following modifications. In FIG. 6, an integral pump 16 is provided, which is similar to the embodiment of FIGS. 1 and 2, and a concentric e-machine (including stator 38 and rotor 40) is provided, which is similar to the embodiment of FIG. 2. As shown in FIG. 6, the e-machine also includes motor windings 45, a resolver 46, and a dynamic seal 47. While these specific features of the e-machine are illustrated in FIG. 6, one of ordinary skill in the art would understand that alternative types of sensors for the e-machine could be used. Additionally, alternative types of seals can be provided to seal the e-machine from the remainder of the assembly.

Figure 7:
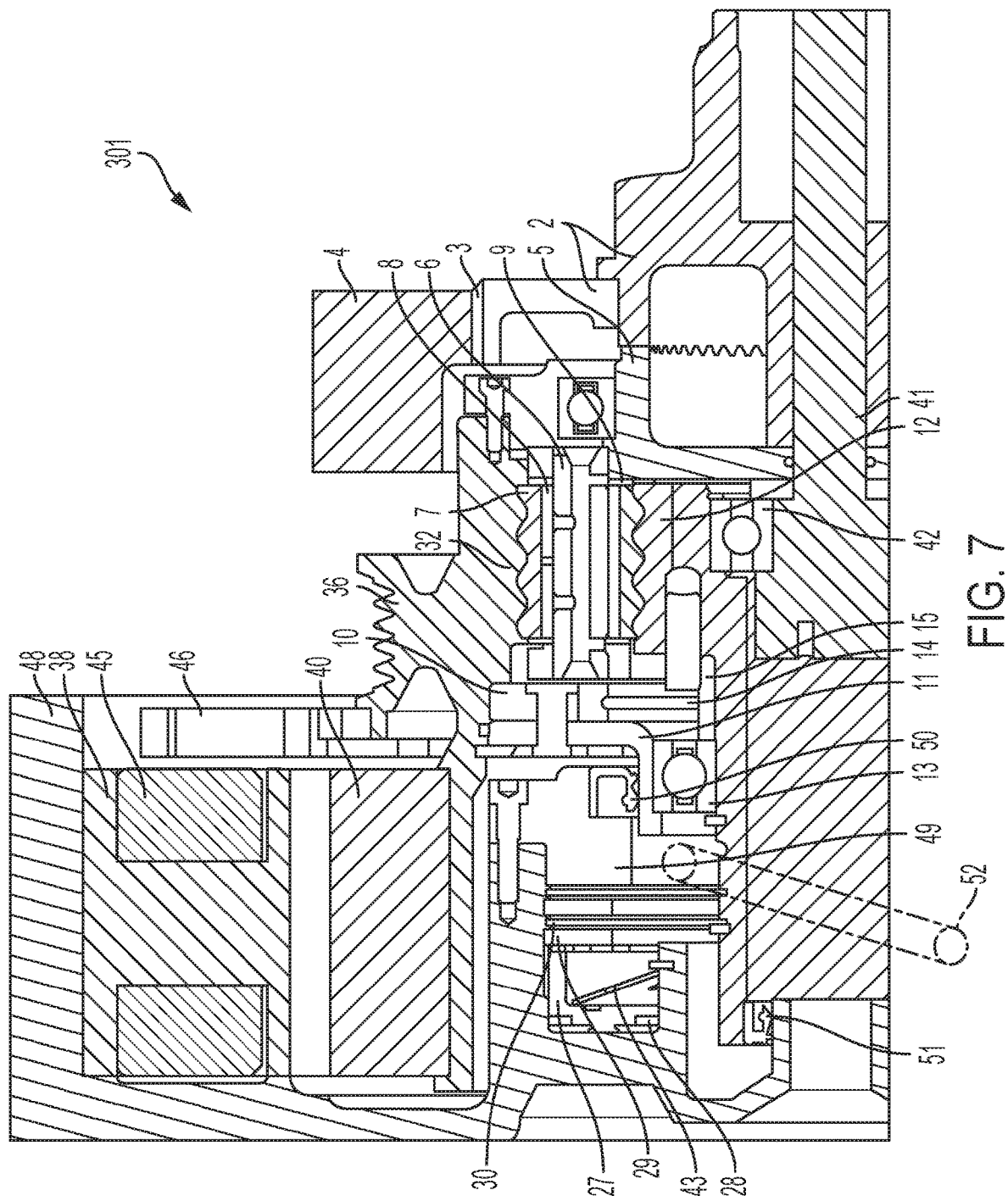
FIG. 7 is a cross-sectional view of a second embodiment of a drive system.
Figure 9:
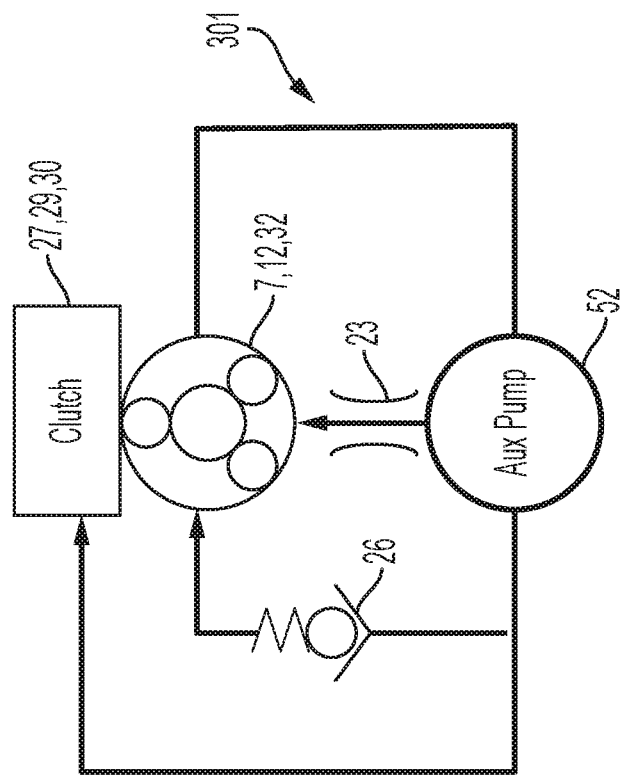
FIG. 9 is a hydraulic diagram for the drive system of FIGS. 7 and 8.
Figure 8:
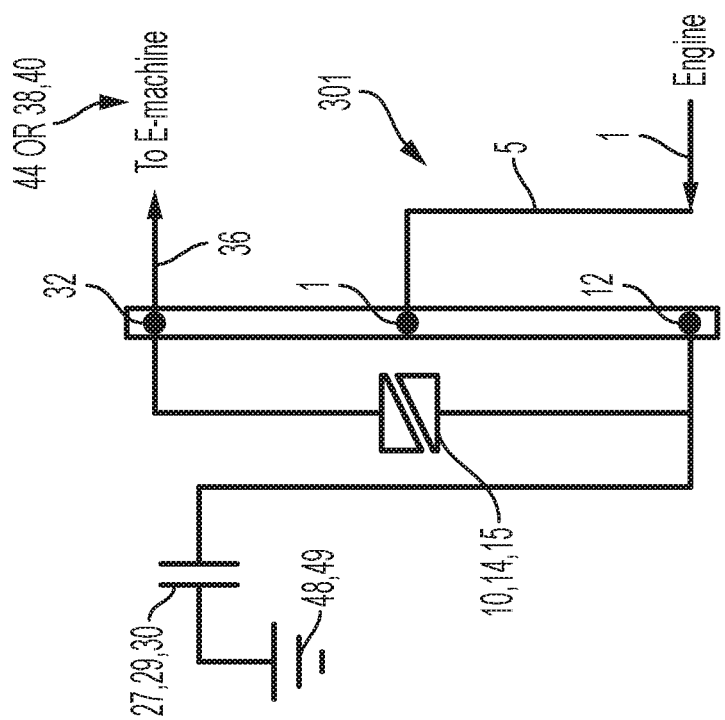
FIG. 8 is a kinematic diagram for the drive system of FIG. 7.

FIG. 7 illustrates another embodiment of a drive system 301, which is functionally identical to the other drive systems 1, 101, 201, unless otherwise specified herein. FIG. 8 illustrates a kinematic layout for this arrangement, and FIG. 9 illustrates a hydraulic layout for this arrangement. In this embodiment, the drive system 301 uses different gear kinematics to provide improved support for the motor rotor via a combined motor and clutch housing 48. The motor and clutch housing 48 supports and houses a concentric e-machine stator 38, windings 45, and a resolver 46. The housing 48 can also contain the hydraulic clutch assembly (i.e. piston 27, separator plates 29, and clutch plates 30) and the return spring 43. When higher torque to the crankshaft is required (e.g., either boosting or starting the engine), hydraulic pressure is supplied to the clutch to ground the sun gear 12 and create a ratio between the e-machine and the crankshaft 2a. In this embodiment, there is no integral pump and instead an auxiliary pump 52 is provided. The auxiliary pump 52 can be provided in another portion of the drive system. Flow is routed from the motor and clutch housing 48 into the body of the gearbox through the OWC bearing 13. Hydraulic fluid then flows through the OWC 10 and gears 7, 12, 32 before exiting through the bearing 42 and back out of the assembly to the auxiliary pump 52. Dynamic seals 50, 51 can be provided to seal off the passage to the pump 52. In one embodiment, at least one of the dynamic seals 50, 51 can be fixed to a sealing housing 49.

Figure 10:
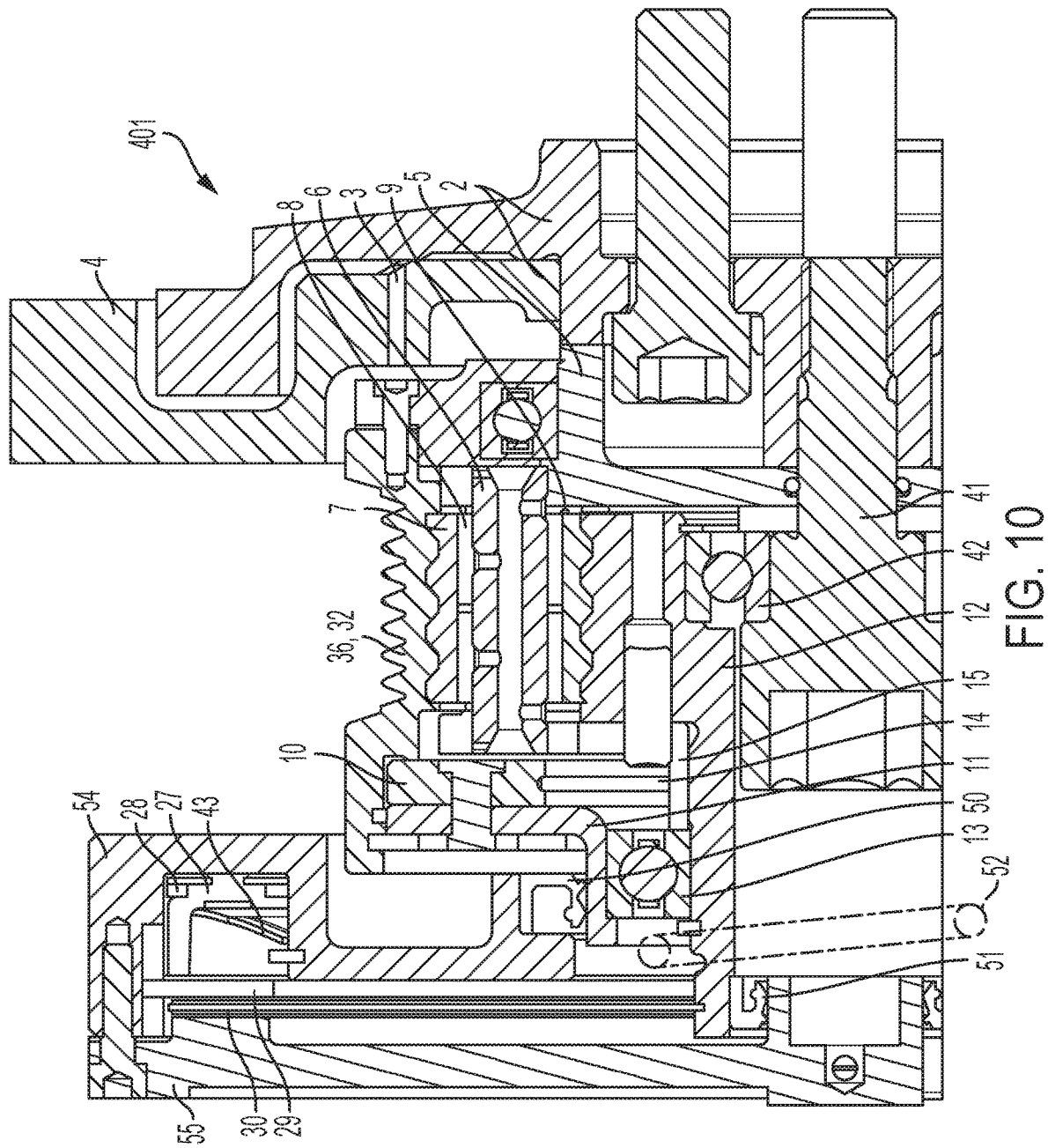
FIG. 10 is a cross-sectional view of a third embodiment of a drive system.
Figure 12:
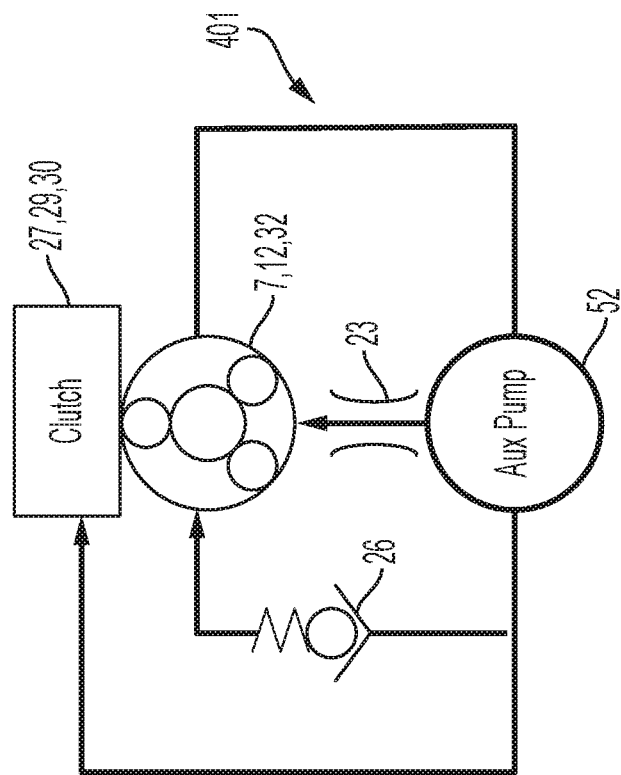
FIG. 12 is a hydraulic diagram for the drive system of FIGS. 10 and 11.
Figure 11:
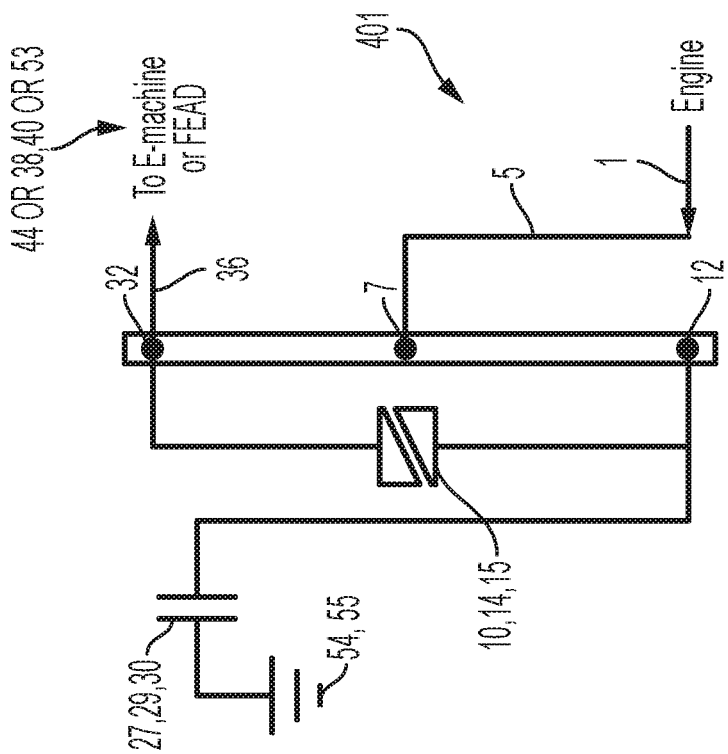
FIG. 11 is a kinematic diagram for the drive system of FIG. 10.

FIG. 10 illustrates another embodiment of a drive system 401, which is identical to the other embodiments unless explicitly discussed herein. FIG. 11 illustrates a kinematic layout for this arrangement, and FIG. 12 illustrates a hydraulic layout for this arrangement. This embodiment again relies on an auxiliary pump and lacks a concentric e-machine. Here, the clutch is contained within the clutch housing 54 and is sealed via a sealing housing 55. All other functional aspects of this embodiment are similar or identical to the other embodiments described herein.

A method of assembly is also disclosed herein. The method includes: positioning the harmonic balancer assembly (i.e. the inertia ring) on the crankshaft 2a; connecting the inner housing 31 to an engine cover; attaching the gearbox with the center bolt 41; mounting the central housing/clutch pack/ring gear/piston subassembly over the gearbox; inserting the pump 16 and sealing with the outer housing 18; and installing the pulley 36 and/or motor rotor 40. This arrangement allows for the entire gearbox to be enclosed by housings 18, 21, 31 and to be a distinct module that can be fixed or bolted onto the engine as a single, unitary module. The pulley and motor (if included) can then also either be part of this module or can be attached to the engine separately after the rest of the assembly.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS

Drive System 1, 101, 201, 301, 401
Crankshaft 2a
Hub 2b
Elastomer 3
Inertia ring 4
Planet carrier 5
Planet pins 6
Planet gears 7
Radial bearing 8
Thrust washers 9
One way clutch 10
Support plate 11
Sun gear 12
Bearing 13
Wedge plates 14
Outer bearing ring 15a
Inner bearing ring 15b
Pump 16
Inner gerotor 16a
Outer gerotor 16b
Outer housing 18
Fluid inlet 19
Dynamic seal 20
Central housing 21
O-ring 22
Orifice 23
High pressure fluid path 24
Valve 25
Blow-off valve 26
Piston 27
Sliding seals 28
Separator plates 29
Clutch plates 30
Inner housing 31
Ring gear 32
Thrust bearings 33
Dynamic seal 34
Fluid outlet 35
Pulley 36
Retaining ring 37
Stator 38
Wires 39
Rotor 40
Bolt 41
Radial bearing 42
Off axis e-machine 44
Motor windings 45
Resolver 46
Dynamic seal 47
Motor and clutch housing 48
Sealing housing 49
Dynamic seals 50, 51
Auxiliary pump 52
Clutch housing 54
Sealing housing 55

What is claimed is:

1. A drive system comprising:
a hub configured to drivingly engage with a crankshaft;
a gear transmission system including:
  a planet carrier connected to the hub;
  a ring gear supporting at least one clutch plate;
  a plurality of planet gears each drivingly engaged with the ring gear;
  a sun gear drivingly engaged with the plurality of planet gears; and
  a plurality of planet pins each including a first end supported in the planet carrier, and each planet gear of the plurality of planet gears is supported on a respective planet pin of the plurality of planet pins;
a one-way clutch including a first bearing ring connected to a second end of the plurality of planet pins, and a second bearing ring connected to the sun gear;
a pump configured to direct hydraulic fluid through a hydraulic fluid circuit;
a clutch pack in fluid connection with the hydraulic fluid circuit, the clutch pack including the at least one clutch plate supported by the ring gear, such that the ring gear is grounded via frictional engagement of the at least one clutch plate in an actuated state of the clutch pack;

an output connected to the sun gear, the output including a pulley; and a central housing and a motor stator mounted on the central housing, the motor stator being positioned radially inside the pulley.

2. The system according to claim 1, wherein the pulley includes a splined connection with the sun gear, and the pulley is retained on the sun gear with a retention ring.

3. The system according to claim 1, further comprising a concentric e-machine including a rotor that is integrally formed with the pulley and including the motor stator.

4. The system according to claim 1, wherein the pump is constantly running via an input from either the crankshaft or an e-machine which includes the motor stator connected to the output.

5. The system according to claim 1, further comprising a solenoid valve in the hydraulic fluid circuit, the solenoid valve being configured to regulate a flow of the hydraulic fluid to the clutch pack.

6. The system according to claim 1, wherein the pump is arranged external from the drive system.

7. A drive system comprising:
a hub configured to drivingly engage with a crankshaft;
a gear transmission system including:
  a planet carrier connected to the hub;
  a ring gear supporting at least one clutch plate;
  a plurality of planet gears each drivingly engaged with the ring gear;
  a sun gear drivingly engaged with the plurality of planet gears; and
  a plurality of planet pins each including a first end supported in the planet carrier, and each planet gear of the plurality of planet gears is supported on a respective planet pin of the plurality of planet pins;
a one-way clutch including a first bearing ring connected to a second end of the plurality of planet pins, and a second bearing ring connected to the sun gear;
a pump configured to direct hydraulic fluid through a hydraulic fluid circuit; and
a clutch pack in fluid connection with the hydraulic fluid circuit, the clutch pack including the at least one clutch plate supported by the ring gear, such that the ring gear is grounded via frictional engagement of the at least one clutch plate in an actuated state of the clutch pack;
wherein the hydraulic fluid circuit defines a lubrication path through the one-way clutch, the gear transmission system, and the clutch pack.

8. The system according to claim 7, further comprising an output connected to the sun gear, wherein the output includes a pulley, and wherein the pulley drives a belt drive and an off-axis e-machine.

9. The system according to claim 7, further comprising an output connected to the sun gear, wherein the output includes a pulley, and further comprising an off-axis e-machine connected to the pulley.

10. A drive system comprising:
a hub configured to drivingly engage with a crankshaft;
a gear transmission system including:
  a planet carrier connected to the hub;
  a ring gear supporting at least one clutch plate;
  a plurality of planet gears each drivingly engaged with the ring gear;
  a sun gear drivingly engaged with the plurality of planet gears; and
  a plurality of planet pins each including a first end supported in the planet carrier, and each planet gear of the plurality of planet gears is supported on a respective planet pin of the plurality of planet pins;
a one-way clutch including a first bearing ring connected to a second end of the plurality of planet pins, and a second bearing ring connected to the sun gear;
a pump configured to direct hydraulic fluid through a hydraulic fluid circuit; and
a clutch pack in fluid connection with the hydraulic fluid circuit, the clutch pack including the at least one clutch plate supported by the ring gear, such that the ring gear is grounded via frictional engagement of the at least one clutch plate in an actuated state of the clutch pack;
wherein the pump is arranged within the drive system between an outer housing and the sun gear.

* * * * *